United States Patent

[11] 3,526,163

| [72] | Inventor | Robert W. Lowery<br>Brentwood, Missouri |
|---|---|---|
| [21] | Appl. No. | 692,487 |
| [22] | Filed | Dec. 21, 1967 |
| [45] | Patented | Sept. 1, 1970 |
| [73] | Assignee | Owens-Illinois, Inc.<br>a corporation of Ohio |

[54] ROTARY DIE CUTTER
5 Claims, 2 Drawing Figs.

[52] U.S. Cl.................................................. 83/27,
83/103, 83/116, 83/346, 18/19, 18/21, 264/156
[51] Int. Cl................................................. B23d 25/12,
B65h 35/10, B26d 1/56
[50] Field of Search.......................................... 83/343,
346, 37, 23, 27, 116, 117, 118, 103; 93/36A;
225/97, 98, 99; 18/21, 19P; 264/156, 145

[56] References Cited
UNITED STATES PATENTS

| 1,750,708 | 3/1930 | Edwards...................... | 83/347X |
| 2,150,391 | 3/1939 | Morris......................... | 225/97 |
| 2,183,722 | 12/1939 | Newman...................... | 83/343X |
| 3,270,929 | 9/1966 | Foster.......................... | 225/97 |

*Primary Examiner*—Andrew R. Juhasz
*Assistant Examiner*—James F. Coan
*Attorney*—Philip M. Rice and W. A. Schaich

ABSTRACT: A rotary die cutter is provided for cutting sheet plastic material into articles having precise patterns or configurations. The cutter has a cylindrical shaft with a knife extending radially outwardly therefrom. One of the surfaces defining the knife blade is disposed at a predetermined angle. The shaft is covered with a rubber coating which is flush with the cutting edge of the knife but which is recessed in the area of said one surface.

Patented Sept. 1, 1970 3,526,163
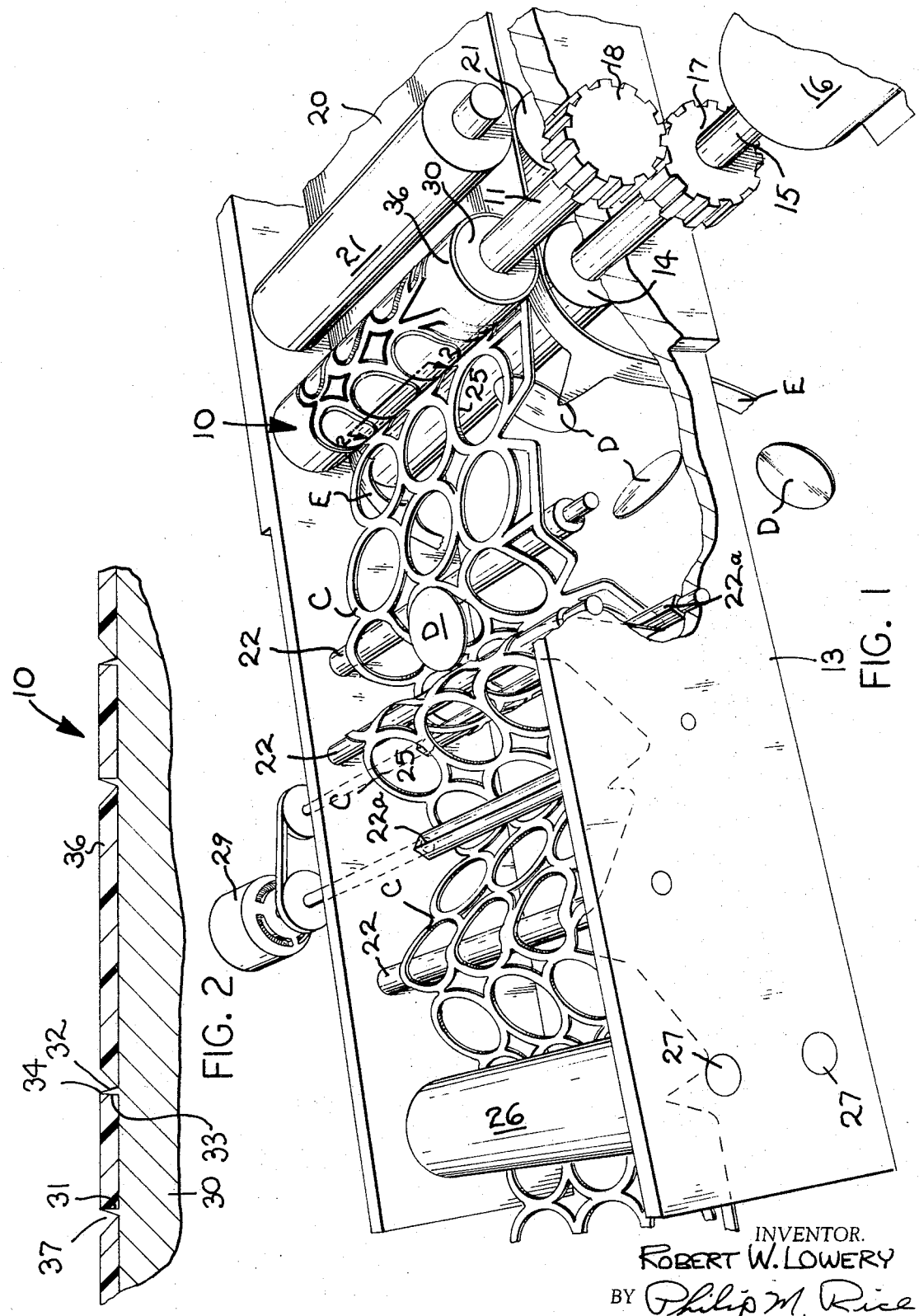
INVENTOR.
ROBERT W. LOWERY
BY Philip M. Rice
& W. A. Schaick
ATTORNEYS 3,526,163

ROTARY DIE CUTTER

BACKGROUND OF THE INVENTION

Recently there has become popular in the marketing of cans and bottles of beer and other beverages a plastic carrier having a plurality of apertures for receiving and retaining a plurality of such containers in a single group or package. Customarily such carriers will retain six or eight cans or bottles to form a six-pack or an eight-pack. One such carrier is described in U.S. Pat. No. 3,314,712. Heretofore, the only commercially acceptable way of cutting the carriers from a sheet of plastic material was by means of a punch press die. Inasmuch as such machine is quite expensive and operates intermittently at a relatively slow speed, it has long been desired to find an improved method and apparatus for performing this operation.

Prior to the present invention, however, all efforts to use rotary die cutters to cut patterns in sheet plastic material were unsuccessful. The problems in cutting sheet plastic material with a rotary die cutter are twofold. In the first place, such prior rotary die cutters would not cleanly sever the plastic material, but rather would tend to leave a very fuzzy edge and fail to cut cleanly through the plastic sheet. Secondly, and more importantly, the plastic sheet would slide in relation to the die cutter with the result that it would not be cut in the desired locations. Hence, the finished product, namely the carriers, would be unacceptable because the apertures were either too big, or too small, or improperly positioned.

The present invention solved the problems relating to cutting plastic carriers from sheets of plastic material, and did so, so successfully that it is now possible to cut commercially acceptable carriers from sheets of plastic material at a faster rate than was possible on the punch press using equipment costing a fraction of the cost of equipment previously required.

Accordingly, it is an object of the present invention to provide a new method and apparatus for forming plastic carriers from a sheet of plastic material.

It is a further object of the present invention to provide means for cutting patterned articles from sheets of plastic material more efficiently and economically than has heretofore been possible.

An additional object of the present invention is to provide a new, novel and economical rotary die cutter which is capable of cutting patterns in sheets of plastic material on a continuous basis.

Other objects and advantages of the present invention will become readily apparent to those skilled in the art from the following detailed description taken in conjunction with the annexed sheets of drawings on which:

FIG. 1 is a perspective view of the rotary die cutter of the present invention; and FIG. 2 is an enlarged fragmentary sectional view of the cutting roller taken along line 2—2 of FIG. 1.

Referring now to the drawings, the rotary die cutter includes a cutting roller 10 mounted on a shaft 11 rotatably supported in bearings (not shown) supported on a frame 13. An anvil roller 14 is positioned immediately beneath the cutting roller 10 and serves as the backing for a sheet 20 of plastic material which is to be fed therebetween and cut into a plurality of joined carriers C. As such, the anvil roll is formed of hardened steel and has a smooth outer surface. If desired, the anvil roller 14 may be formed approximately one one-thousandth inch (.001") greater in diameter at the center than at the ends in order to compensate for any deflection. The cutting roller 10 and the anvil roller 14 cooperate to cut, from the sheet 20 of the plastic material, discs D to form apertures 25 and edge strips E to form the edges of the interconnected string of carriers C. As can be seen from the above-referenced U.S. Pat. No. 3,314,712, the apertures 25 are sized to receive bottles or other containers therein.

The anvil roller 14 is mounted on a shaft 15 which is supported in bearings (not shown). The shaft 15 is rotatably driven by a motor 16 mounted on one end thereof. A pinion gear 17 engages a corresponding pinion gear 18 mounted on the shaft 11 to power the rotary movement to the cutting roller 10. If desired, the power means from the motor 16 can be connected only to the cutting roller 10 with no provision made for driving the anvil roller 14. In such case, any rotation of the anvil roller will be imparted thereto by friction from the cutting roller 10 with the sheet 20 passing therebetween. A pair of guide rollers 21 are positioned to receive and guide the sheet 20 of the plastic material between the cutting roller 10 and the anvil roller 14. In addition to guiding the sheet 20 into position, the guide rollers 21 serve to insure that no substantial tension is placed on the sheet 20 which would stretch it during cutting. Thus, in order to insure that the sheet 20 is cut at precisely the proper locations to obtain carriers C capable of functioning for the intended purpose, such sheet should be in a substantially untensioned condition as it moves between the cutting roller 10 and the anvil roller 14. The guide rollers may be driven off the motor 16 or other conventional means.

If desired, the guide rollers 21 can be eliminated and other conventional means used for feeding the sheet 20 between the cutting roller 10 and the anvil roller 14 in a substantially untensioned condition. As previously mentioned, the critical feature is that the sheet 20 be substantially untensioned when fed between the cutting roller 10 and the anvil roller 14 and not what specific means are used to accomplish this.

Downstream from the cutting roller 10 and the anvil roller 14 are a plurality of guide bars 22 which are positioned to direct the string of interconnected carriers C through a tortuous path. The purpose of guiding the string of interconnected carriers through such a path is to insure that the discs D cut therefrom to form the apertures 25 are actually removed from the apertures 25 and are not inadvertently retained therein.

At the end of the frame 13 are provided a pair of take-out rollers 26 mounted on shafts 27 for pulling the interconnected string of carriers C from the frame 13. The shafts 27 may be connected to the motor 16 by any conventional means to drive the take-out rollers 26 at such speed as to exert a slight tension on the interconnected string of carriers C passing through the tortuous path. Tension on the interconnected string of carriers during movement through such tortuous path serves to insure that all cutout discs D are urged free from the apertures 25. Two of the guide bars 22a are formed with a square cross-sectional configuration and are driven from a motor 29 at a substantially higher rate of speed than and/or in a reverse direction from the moving string of carriers. Other mechanical as well as blower means may be used to aid in removal of the discs D.

Referring now to FIG. 2, the cutting roller 10 comprises a generally cylindrical shaft portion 30 having knives 31 extending generally radially outwardly therefrom. The knives 31 are defined between a pair of surfaces 32 and 33 which extend outwardly and join at a cutting edge 34. Preferably, the included angle between the surface 32 and the surface 33 is a relatively small acute angle on the order of 12°; however, tests have shown that this angle may be between 8° and 20°. If the angle is in excess of 20°, the cutting of the sheet of plastic material will result in a fuzzy edge. The limitation of the 8° is based primarily on retaining a sufficient amount of material to give strength to the knife 31. Preferably, the surface 33 is either normal to the shaft or disposed at an angle to provide a slight undercut from a line normal to the shaft and passing through the cutting edge 34. It will be appreciated that the smaller the angle between the surface 32 and the surface 33, the thinner will be the knife 31.

The shaft 30 is covered with a coating of high friction material such as vulcanized rubber 36. The coating 36 is substantially flush with the cutting edge 34 of the knives 31. The coating 36 preferably extends to the surface 33 of the knife 31; however, the portion of the rubber coating 36 adjacent to the angled surface 32 is cut away leaving a groove 37 between the coating and the surface 32 and, hence, leaving such surface 32 bare. Such construction serves to prevent the sheet of plastic material from slipping during the cutting and, hence, insures that the apertures 25 of the carriers C will always be properly positioned. Additionally, the groove prevents the cutting edge from being impeded by the rubber coating. Finally, the groove 37 provides an area in which the portion of sheet plastic material on one side of a cut can be displaced while the portion of plastic material on the opposite side of the cutting edge 34 is maintained in its original plane, thus insuring that complete severing is accomplished.

It will be readily appreciated that the foregoing construction of the cutting roller 10 permits the knives 31 to be readily resharpened. The knives 31 are initially formed so that the cutting edge 34 is from .003 to .005 inch in breadth. Such construction permits sharpening of the knife by grinding the exposed surface 32 without lowering the cutting edge 34 below the surface of the rubber coating 36.

Upon leaving the rollers 26, the interconnected strip of carriers C may be wound on a supply roll or otherwise packaged for shipment to the brewery or bottler which will apply such carriers to a group of bottles or cans.

It can be seen from the foregoing that the present invention provides a method and apparatus for cutting sheet plastic material which is much more economical and efficient than any heretofore known. While attempts have often been made to utilize rotary die cutters for cutting plastic materials, none has ever been able to effectively accomplish it to the standards required for a commercial operation.

Inasmuch as numerous modifications will become readily apparent to those skilled in the art, the scope of the present invention should be viewed not by the specific disclosure but rather by the claims appended hereto.

I claim:

1. A rotary die cutter comprising:
   a. a cutting roller including a cylindrical shaft, knives extending outwardly from said shaft, said knives defined by a pair of surfaces meeting at a cutting edge, one of said surfaces being substantially normal to said shaft, the other of said surfaces being disposed at an acute angle with respect to said one surface, a coating of high friction material encircling said shaft and extending outwardly to said cutting edge, said coating being recessed in the area of said other surface;
   b. an anvil roller cooperating with said cutting roller to receive therebetween sheet plastic material to be cut;
   c. a plurality of guide members positioned downstream from elements (a) and (b) defining a tortuous path through which the cut sheet material may travel; and
   d. a pair of take out rollers positioned downstream from said guide members and means for driving said take out rollers at a speed which places tension on the cut sheet material as it passes through said tortuous path.

2. A rotary die cutter comprising:
   a. a cutting roller including a cylindrical shaft, knives extending outwardly from said shaft, said knives defined by a pair of surfaces meeting at a cutting edge, one of said surfaces being substantially normal to said shaft, the other of said surfaces being disposed at an acute angle with respect to said one surface, a coating of high friction material encircling said shaft end extending outwardly to said cutting edge, said coating being recessed in the area of said other surface;
   b. an anvil roller cooperating with said cutting roller to receive therebetween sheet plastic material to be cut; and
   c. a plurality of guide members positioned downstream from elements (a) and (b) defining a tortuous path through which the cut sheet material may travel, at least one of said guide members having a noncircular cross sectional configuration and further including means for driving said noncircular guide members to give relative movement between said noncircular guide members and the cut sheet.

3. A plastic cutting mechanism comprising in combination a cutting roller comprising a cylindrical shaft, a knife extending generally radially outwardly from said shaft and terminating in a cutting edge, said knife having a surface extending to said cutting edge, the included angle between said surface and a line normal to said shaft being acute, a coating of high friction material on said shaft, said coating being substantially flush with said cutting edge, said coating being recessed in the area of said knife surface leaving the portion of said surface adjacent said cutting edge uncoated, and an anvil roller spaced from said cutting roller and having a larger diameter at its midpoint than at its ends.

4. The method of cutting a sheet of plastic material into a string of interconnected articles having apertures comprising the steps of:
   a. feeding the sheet between a cutting roller and an anvil roller to cut said sheet into an interconnected string of articles;
   b. urging a friction element against said sheet on opposite sides of the portions to be cut during the step of cutting;
   c. maintaining said sheet substantially free from tension during said cutting step;
   d. passing the interconnected string of articles through a tortuous path to remove waste material from the apertures; and
   e. maintaining tension on said interconnected string of articles as it passes through said tortuous path.

5. A rotary die cutter comprising in combination:
   a. a cutting roller including a cylindrical shaft, knives extending outwardly from said shaft, said knives terminating at their outer portions in a cutting edge, a friction element on said shaft extending outwardly to said cutting edge;
   b. an anvil roller cooperating with said cutting roller to receive therebetween sheet plastic material to be cut, said friction element urging the sheet plastic material against the anvil roller;
   c. a plurality of guide members positioned downstream from elements (a) and (b) defining a tortuous path through which the cut sheet may travel; and
   d. a pair of take out rollers positioned downstream from said guide members and means for driving said take out rollers at a speed which places tension on the cut sheet material as it passes through said tortuous path.